United States Patent [19]

Lahey et al.

[11] Patent Number: 5,041,994

[45] Date of Patent: Aug. 20, 1991

[54] DATA STORAGE SYSTEM AND METHOD FOR A LASER PRINTER

[75] Inventors: Seana L. Lahey; Charles J. Blackbird, both of Boise, Id.

[73] Assignee: Hewlett-Packard Company, Palo Alto, Calif.

[21] Appl. No.: 664,425

[22] Filed: Mar. 4, 1991

Related U.S. Application Data

[63] Continuation of Ser. No. 484,151, Feb. 23, 1990, abandoned.

[51] Int. Cl.$^5$ ............................................. G06K 15/00
[52] U.S. Cl. ..................................................... 364/519
[58] Field of Search ........ 364/518, 519, 523, 235 MS, 364/930 MS, 930.5 MS, 957.7 MS, 964.2 MS, 235.6 MS, 246.1 MS, 246.2 MS; 340/745, 750, 740; 400/72, 73

[56] References Cited

U.S. PATENT DOCUMENTS 4,737,779  4/1988  Somigli et al. ...................... 340/740

Primary Examiner—Arthur G. Evans
Attorney, Agent, or Firm—William J. Bethurum

[57] ABSTRACT

A novel method and system for operation in combination with a laser printer for expanding its character and typeface selection capability. The sequence and operation for this method and system include dividing a list of characters to be printed into a plurality of character groupings or collections, storing these character groupings or collections in a plurality of different memories or memory sites, and providing an input command signal to these memories or memory sites which corresponds to a selected character desired to be printed. The different memories or memory sites are addressed starting first with the memory or memory site storing the largest character grouping or collection having the most frequently used characters therein and then addressing the different memories or memory sites in sequence to or toward the memory or memory site storing the smallest number of less-frequently used characters therein. In this manner, the memory storage capability and computational speed of the laser printer are maximized, and the price/performance figure of merit and reliability of the printer are also maximized.

6 Claims, 2 Drawing Sheets

DATA STORAGE SYSTEM AND METHOD FOR A LASER PRINTER

CROSS REFERENCE TO RELATED APPLICATION(S)

This is a continuation of copending application(s) Ser. No. 07/484151 filed on Feb. 23, 1990, now abandoned.

TECHNICAL FIELD

This invention relates generally to electrophotographic or laser printers and more particularly to a laser printer having a large number of scalable typefaces available from a given amount of printer memory. These laser printers are manufacturable at a relatively low cost and they represent a significant price/performance breakthrough in the art and technology of laser printing.

BACKGROUND ART

Electrophotographic or laser printers have been commercially available for several years and are known to provide some of the highest forms of print quality on the printed media in all of the fields of both impact and non-impact printing. An example of these laser printers is the Hewlett-Packard LaserJet Series II printers which are described in the *LaserJet Series II User's Manual*, part number 33440-90901 available from the Hewlett-Packard Company (HP) of Palo Alto, Calif. These Hewlett-Packard LaserJet Series II printers include, among other things, means for receiving user input printer language commands via a computer interface cable, means for interpreting these user input printer language commands such as the Hewlett-Packard Printer Command Language (PCL), and means connected to these interpreting means for accessing the appropriate digital data from printer memory. This digital data is accessed and processed in order to obtain corresponding printable character data representative of a particular size, treatment (e.g., style and stroke weight), and print orientation. This type of character data is also known in the art as bitmap data. This character data is in turn used for controlling a laser beam of the laser printer, and the laser beam in turn is operative to write a printed image on a photoconductive drum of the laser printer. The printed image is then transferred from the photoconductive drum to an adjacent print media as is well known in this art.

As used herein and as is generally understood in this art, the term "typeface" is defined as a group of characters that have similar design features. Often a typeface will be available in several treatments, e.g., bold, italic, etcetera. Within the HP LaserJet Series II and all other HP PCL printers, characters within a typeface are accessed by a user through character sets. The term "character set" as used herein and as is generally understood by those skilled in the art is defined as a grouping of characters, generally containing many less characters than all characters designed for typeface, and arranged with a specific printer application in mind. For example, the legal and math character sets are generally designed to support legal and scientific applications, and they contain only those characters used in the particular application (e.g., there is no square root character in the legal character set).

Whereas these HP LaserJet Series II printers have been highly regarded and widely accepted by consumers throughout the world as the latest in state-of-the-art laser printing technology, these laser printers nonetheless have an upper limit on the number of characters in unique character sets and typeface treatments which are available from a given amount of memory storage capacity of the printer. This memory for the HP LaserJet Series II printer is read-only-memory (ROM).

One reason for this upper limit on the memory for character storage capability of the HP LaserJet Series II printer is that this printer was designed so that each character of each typeface in each treatment and for each size was stored separately in memory and represented with unique digital data (i.e., bitmap data) therein. This was true even though certain characters are common across multiple typefaces and typeface treatments. This latter design characteristic of the HP LaserJet Series II printer obviously required a significant duplication of memory storage for identical characters in the different available typeface treatments.

The above duplication of ROM memory storage is undesirable for a number of reasons. Firstly, the requirement for additional ROM to add character storage capability to a laser printer can mean an additional ROM cost of between $9.00 and $12.00 per ROM semiconductor chip. When this additional cost is multiplied by a standard manufacturing cost multiplier of typically between 3 and 4, this can mean adding as much as $50.00 to the consumer cost in an extremely competitive marketplace.

Secondly, the requirement for adding more ROM memory capability to a laser printer means the addition of more pins on the printed circuit board which supports the ROMs, and this in turn means lowering printer reliability. Thus, the high desirability of minimizing memory storage (ROM) requirements in laser printers while simultaneously maximizing the character storage capability of the printer is manifest.

DISCLOSURE OF INVENTION

Accordingly, the general purpose and principal object of the present invention is to maximize the number of available printable characters for a laser printer for a given amount of printer memory storage capacity, such as in a given number of semiconductor read-only-memories on a printer's controller board or in plug-in type cartridges therefor.

To accomplish this purpose, we have discovered and developed a method and system for processing information or data between an input/output data stream for a laser printer and an output print control mechanism therefor which includes storing in memory a plurality of character set mappings defined as "recipes" for creating character sets for a chosen application or language from the characters stored in the ROM memory. The characters stored in memory have numbers associated with them that are independent of particular characters sets and are organized into several categories including those characters specific to a given typeface and treatment (typeface sensitive), those characters whose design and appearance varies among several classes and/or treatments of typefaces but are common to more than one typeface (limited sensitivity), and finally those characters whose appearance does not vary between typefaces (universal), and are therefore in every typeface. A character set map is used to determine the number of the character specified by a user. The typeface sensitive characters group is the largest and most commonly used, and is therefore searched first for a character corresponding to the one the user has specified. If no match is found, the limited sensitivity characters are searched next. Again, if no match is found, the universal characters are searched. Once the character data is located, the character is scaled to a desired height and width, and this process may be repeated several times for characters that are composites of several pieces. The novel combination of: (1) the character set mapping and multiple use of limited sensitivity and universal characters and (2) the subsequent scaling and character composition thereof maximizes the character storage capability for the printer for a given amount of printer memory available.

Another object of this invention is to provide a new and improved laser printer of the type described whose manufacturing and consumer costs have been minimized, while simultaneously maximizing printer reliability.

A unique feature of this invention is the provision of character scaling means connected to receive character data stored in printer memory and operative for scaling a character selected from one of the memories or memory sites to a desired height and width, thereby providing variable size character input data for driving a printing mechanism.

Another feature of this invention is the provision of a method and system of the type described which includes means for dividing the characters for printing into a plurality of character groupings or collections which are based upon a need for character variability. These groupings or collections include typeface sensitive characters, limited sensitivity characters, and universal characters which are described below.

The above objects, features, and various other advantages of this invention will become better understood and appreciated with reference to the following descriptions of the accompanying drawings.

DESCRIPTION OF THE PREFERRED EMBODIMENT

Figure 1:
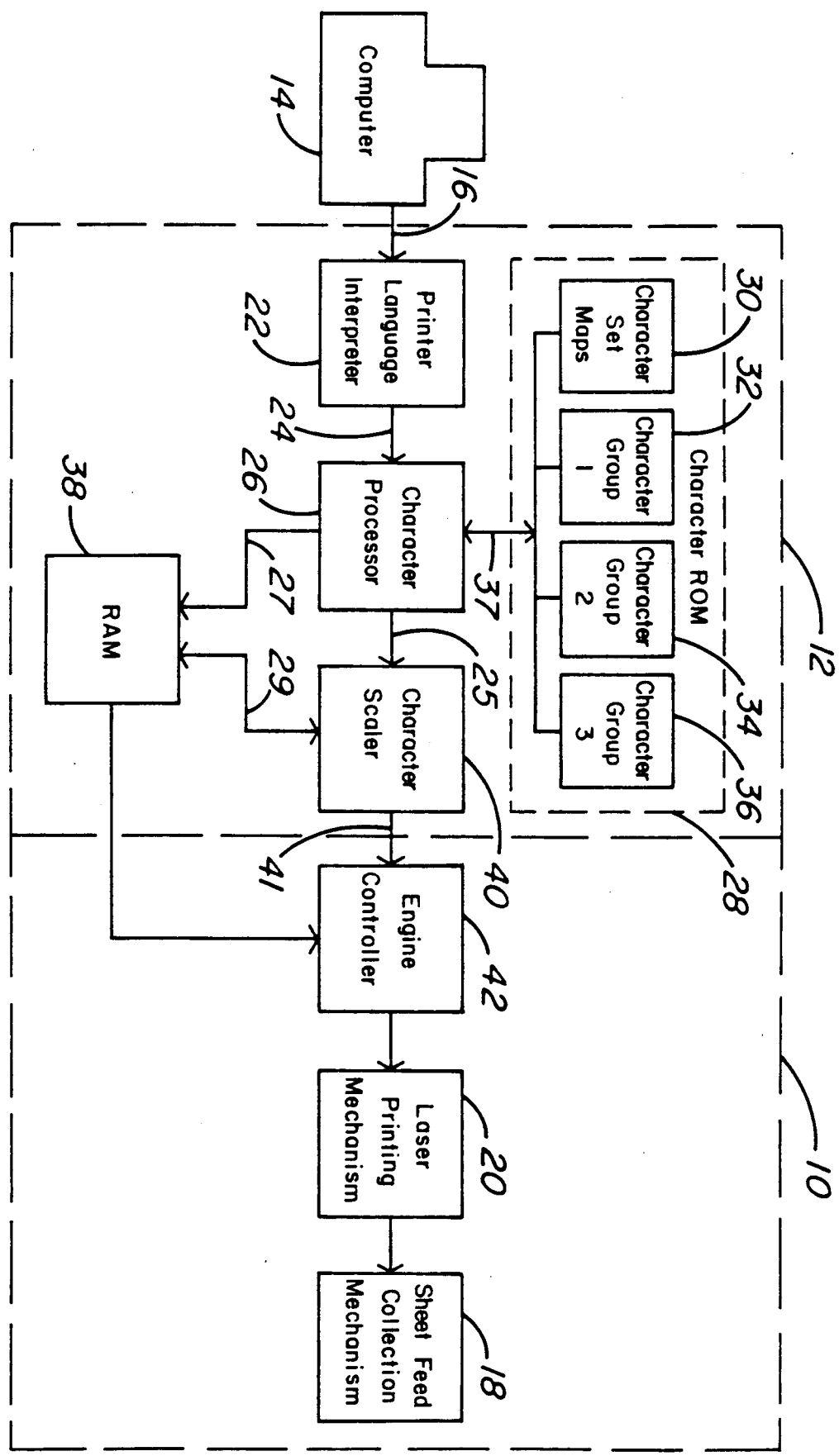
FIG. 1 is a functional block diagram of the laser printer and control system therefor according to the present invention.

Referring now to FIG. 1, the new and improved laser printer 10 according to the present invention includes therein a novel laser printer control system 12 which is connected to receive its input command data from an operator at a computer 14. The computer 14 is connected to the control system 12 by way of a cable 16, and the hardcopy output of the laser printer is derived from a sheet feed and collection mechanism 18. As is known in the art, the hardcopy output at the media collection stage 18 is produced by a laser printer mechanism 20 which includes, among other things, means for controlling a laser beam which is used to write a printed image on a photoconductive drum. This printed image is transferred from the photoconductive drum to an adjacent print media (neither shown) as is also well known in the art. In the embodiment shown in FIG. 1, the printed media will normally be cut sheets of laser printed output hardcopy available at stage 18.

The input command data received via cable 16 is received and interpreted by a printer language interpretation program 22 located on the printer controller board (not shown). This program 22 records the commands that specify the user's desired character set, size, treatment, and typeface. When this program subsequently receives commands to print particular characters, it generates a command signal on line 24 which is applied to a character processor 26. The character processor 26 in turn executes a character processing program that makes the appropriate electrical connections via line 37 to read the ROMs 28 containing scalable character data. The ROM containing the character set maps 30 is accessed first. The character set map corresponding to the user requested character set is located by way of a linear search. Once the map is located, the memory location within the map corresponding to the character set number of the character that the user requested is accessed; therein is stored a number that corresponds to the actual character requested. The character processing program then searches the Group 1 memory 32 containing the typefaces sensitive characters of the requested typeface for the character with the appropriate number. The typeface sensitive characters in Group 1 memory 32 are searched first because there is the greatest probability that the character will be found in this group.

If the requested character is not located among the typeface sensitive characters in the Group 1 memory 32, the appropriate limited sensitivity characters in Group 2 memory 34 are searched. If a requested character is still not located, the universal characters in Group 3 memory 36 are searched. Once the desired character is located, the data describing this character is copied by the character processor and applied via line 27 to a temporary location in a random-access-memory (RAM) 38. A character scaling program is then executed in a character scaler stage 40 by a signal applied via line 25 from the character processor 26. This program reads the character data stored in the RAM 38 via line 29 and generates a printable character that corresponds to the user requested character size. This printable character is then stored in RAM 38 for latter access by a program in an engine controller 42. The engine controller program in stage 42 then reads the RAM 38 via a signal on line 41 and sends the printable character data to the laser printing mechanism 20. The laser printing mechanism 20 places the character image on the photoconductive drum which is subsequently transferred to a sheet of paper, a process well known in the art.

As will be readily appreciated by those skilled in the art, this unique and elegantly simple division of characters which are grouped in the three memory locations 32, 34, and 36 and which are serially addressed and interrogated as described above using character set maps 30 has the effect of significantly reducing the overall amount of memory required to generate a given number of characters in a laser printer. Or conversely, given a certain upper limit on laser printer memory as dictated, for example, by printer cost and price limitations, the laser printer according to the present invention is constructed to contain and provide a heretofore unavailable maximum amount of character data from which a heretofore unavailable maximum number of unique printed images may be produced.

When used in combination with the above novel character storage and access method and system, the character scaler 40 provides an additional amount of memory saving which is made possible by its ability to scale every individual character to a desired height and width. Laser printers in the prior art, such as the Hewlett-Packard LaserJet Series II printer, have traditionally used separate memory to store the same character of a different size, and this size variability is now provided by the character scaler 40.

The printer command language interpreter 22 per se and the concept of character scaling per se are not new and are not individually claimed as new herein. The particular language used by the interpreter 22 is well known in this art as the HP PCL Printer Command Language, and a further detailed discussion of such language may be found in the *LaserJet Series II Technical Reference Manual*, HP part number 33440-90905. Similarly, character scaling has been used in various applications in the past to scale characters to a selected height and width. Typesetter controllers and typesetting proofing devices are examples of printing apparatus which have been previously equipped with a character scaling capability. One such typesetter controller device is sold by Compugraphic Division of Agfa Corporation under the tradename of GENICS. However, it will be understood and appreciated from the description herein that the use of character scaling in combination with the character storage format and access techniques represents a novel method combination and a novel system combination useful in maximizing the total character output printing capability for a given amount of printer memory.

Figure 2:
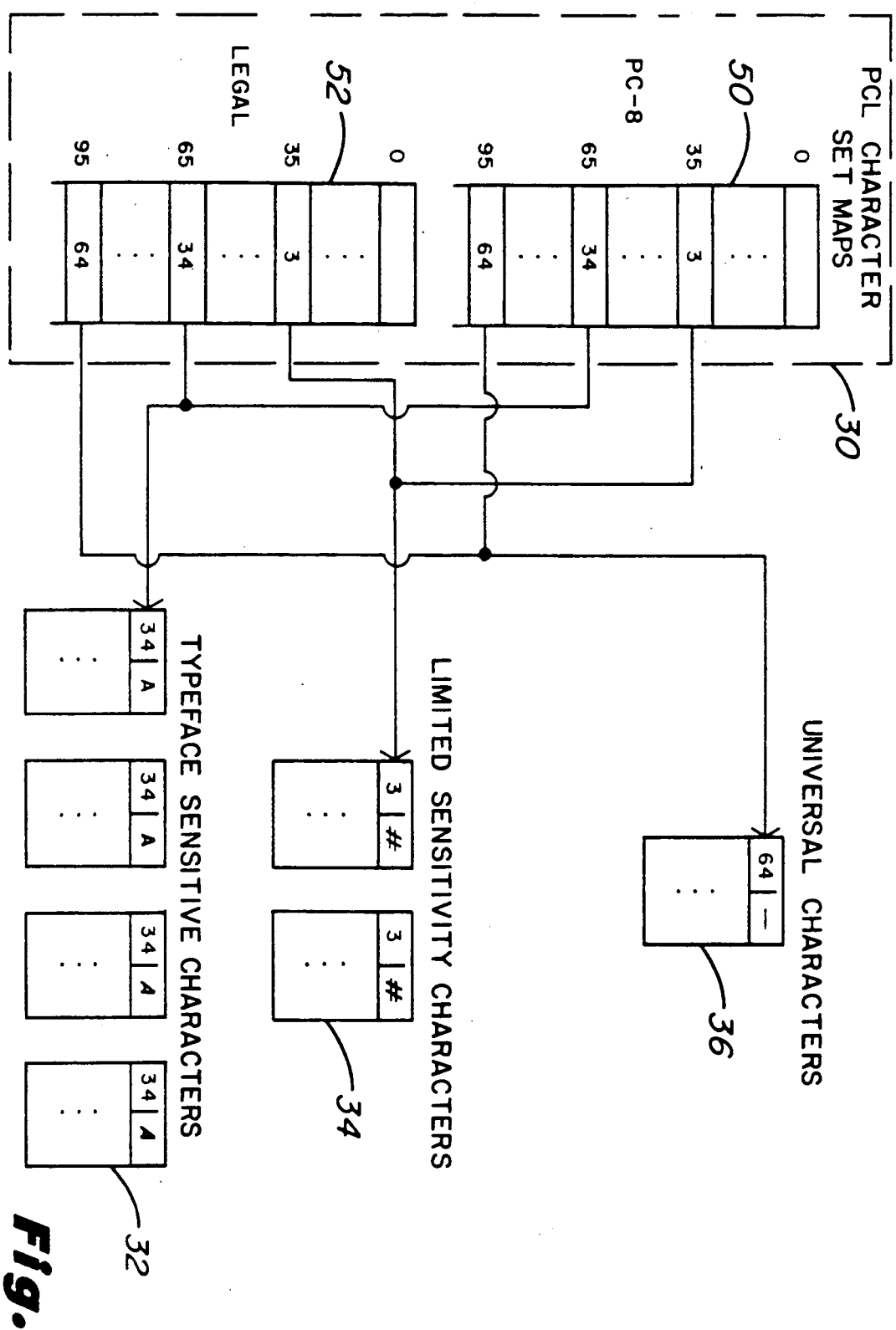
FIG. 2 is a functional block diagram of one example of the organization of the typeface character data and memory interface shown in FIG. 1.

Referring now to FIG. 2, the PCL character set maps 30 include for purposes of illustration a map 50 which is identified as "PC-8" and a map 52 which is identified as "Legal". These application-specific maps include therein the character set numbers 0–95 and the character look-up numbers, for example, (3), (34), and (64). These character look-up numbers (3), (34), and (64) are connected as shown, respectively, to the ROMs 34, 32, and 36 which store the Group 2, Group 1, and Group 3 memories, respectively. In FIG. 2, the character processing program in the character processor 26 in FIG. 1 accesses a PCL Printer Command Language character set map 36 that corresponds to the character set requested by the user. These maps contain the look-up number of each of the characters in the selected character set. This look-up number is used when searching the Group 1, 2, and 3 memories 32, 34, and 36.

As an example of operation, a so called "_" or underscore character may be desirable for use within multiple character sets; however, the underscore character does not vary in appearance across multiple typeface treatments. Therefore, the same underscore character can be used with every one of a large variety of character sets such as those described by the character set maps 30. The underscore character is therefore defined herein as a "universal" character, since it may be used universally among many different typefaces and typeface treatments.

In accordance with the present invention, if a user selects the PC-8 character set followed by typing an underscore character "_" from the keyboard of his or her computer and then requests that this character be printed, the printer language interpreter program in stage 22 in FIG. 1 then requests that the character processing program in the character processor 26 (FIG. 1) search the ROM 30 for the PC-8 character set map 50. Simultaneously, the character set number location 95 in FIG. 2 is accessed to identify the underscore character's look up number (64). The character processing program in the character processor 26 then searches the Group 1 characters in the ROM 32 for character number 64. Since the underscore character is not in Group 1, the next Group 2 is searched in the ROM 34. Finally, the character Group 3 in the ROM 36 is searched and the underscore character is located. This character data is then copied to the RAM 38 and the character scaler 40 (FIG. 1) uses this data to generate an image of the appropriate size. Therefore, it will be appreciated by those skilled in the art that only a single underscore character now need be stored in ROM, and that duplicate storage of this universal character is totally eliminated in accordance with the present invention.

If a typeface sensitive character such as the letter "A" is selected from the keyboard and printed in either the PC-8 or Legal character sets 30, the corresponding character look-up number (34) will be used to locate the "A" in the requested typeface and treatment. Again, the search begins with the memory in the ROM 32. In this case, the requested typeface sensitive character is found in this first search location. Since "A" is more commonly used than "_", the overall access speed of the system is enhanced by virtue of the order in which the three character groups in ROM 32, 34, and 36 are searched.

As a final example, assume that a limited sensitivity character such as the pound sign "#" or number abbreviation sign "#" is selected for printing. There is a need only for a restricted number of different treatments of this character, (medium and bold are shown), as compared to the four different treatments of the typeface "A" shown. This represents a savings in memory storage equivalent to the size of two pound sign characters.

It should be apparent from the above description of FIG. 2 that character set maps 30 are only two of a much larger number of character set maps which may be used in accordance with the present invention. Similarly, the universal characters, limited sensitivity characters, and typeface sensitive characters used for example and illustration in FIG. 2 are representative of a larger number of characters that may be added to the above three storage groupings and made available in accordance with the novel teachings of the present invention.

Various other modifications may be made in and to the above described embodiments without departing from the scope of this invention. For example, if required for certain printing applications, the above three character groupings can be either expanded to a larger number or reduced to two. Furthermore, the present invention is not limited to laser printers and may be used for memory saving purposes in other types of printers such as impact printers, thermal printers, ink jet printers and the like. Accordingly, these types of variations as well as design variations and changes of hardware and software for the systems described above are within the scope of our appended claims.

We claim:

1. A method for maximizing the number of available printable characters for a laser printer for a given amount of printer memory storage capacity, including the steps of:

a. storing in different memory sites different character groupings or collections based upon a need for character variability and including, respectively, the groupings of typeface sensitive characters, limited sensitivity characters, and universal characters, b. storing in yet another separate, character set map memory site a plurality of character set maps defined as recipes for creating character sets for a chosen application or language from the different character groups or collections in paragraph a. above, c. interpreting and recording user input command data using a printer language interpretation program which is operative to record the commands that specify the user's desired character set, size, treatment, and typeface, d. generating a command signal when said interpretation program receives commands to print particular characters and then applying said command signal to a character processor, e. executing a character processing program in said character processor and utilizing said character processing program to access first a particular character set map stored in a memory site in paragraph b. above to select therefrom the user's selected character set map, and then f. accessing in sequence said memory sites in paragraph a. above until a character within the user's selected character set is located, and then g. processing said located character as input data to an electrophotographic printer.

2. The process defined in claim 1 which further includes scaling said selected character to a desired size before being applied to said electrophotographic printer.

3. A system for maximizing the number of available printable characters for a laser printer for a given amount of printer memory storage capacity, including in combination:

a. means for storing in different memory sites different character groupings or collections based upon a need for character variability and including, respectively, the groupings of typeface sensitive characters, limited sensitivity characters, and universal characters, b. means for storing in yet another separate character set map memory site a plurality of character set maps defined as recipes for creating character sets for a chosen application or language from the different character groups or collections in paragraph a. above, c. means for interpreting and recording user input command data using a printer language interpretation program which is operative to record the commands that specify the user's desired character set, size, treatment, and typeface, d. character processing means connected to said interpreting and recording means for generating a command signal when said interpretation program receives commands to print particular characters and then applying said command signal to a character processor, e. means within said character processing means for executing a character processing program in said character processor means and utilizing said character processing program to access first a particular character set map stored in a memory site in paragraph b. above to select therefrom the user's selected character set map, f. means connected between said character processing means and all of said memory sites in paragraph a. above for accessing in sequence said memory sites until a character within the user's selected character set is located, and g. means connected to said character processing means for processing said located character as input data to an electrophotographic printer.

4. The system defined in claim 3 which further includes means for applying said selected character to a character scaling stage at the output of said character processing means and thereby scaling said selected character to a desired size before being applied to said electrophotographic printer.

5. A control system for a printer which is operative to receive print language input data from a computer including, in combination:

a. a print language interpretation stage for receiving said print language input data from said computer and for generating command signals in response thereto, b. a character processing stage connected to receive said command signals from said print language interpretation stage and for thereby executing a character processing program therein, c. a plurality of memory stages for storing, respectively, character set maps, typeface sensitive characters, limited sensitivity characters, and universal characters, and d. data accessing means connected between an output of said character processing stage and all of said plurality of memory stages in paragraph c. above, said data accessing means including a printer language interpretation program in said print language interpretation stage which is operative to select a character processing program in said character processing stage for then searching for the desired character set map, and said character set map is selected to in turn search through the remaining memory stages in paragraph c. above in sequence until a desired character is located and then transmitted by way of data selection means and back to said character processing stage which thereby operates to generate an output character data signal.

6. The system defined in claim 5 which further includes character scaling means connected to receive output data from said character processing stage and operative to scale selected character data to a desired height and width before being applied to an associated printer.

* * * * *